United States Patent [19]

Kranick

[11] Patent Number: 5,338,012
[45] Date of Patent: Aug. 16, 1994

[54] VEHICLE SUSPENSION

[75] Inventors: Gordon S. Kranick, Snohomish, Wash.

[73] Assignee: Paccar Inc., Bellevue, Wash.

[21] Appl. No.: 871,943

[22] Filed: Apr. 22, 1992

Related U.S. Application Data

[62] Division of Ser. No. 678,017, Apr. 1, 1991, Pat. No. 5,186,485.

[51] Int. Cl.$^5$ ............................................. F16M 7/00
[52] U.S. Cl. .................................. 267/140.5; 267/292
[58] Field of Search ............ 267/292, 293, 294, 140.12, 267/140.4, 140.5, 141.2, 141.7, 281, 282, 152, 153, 258; 280/673, 690; 16/2; 403/225–228; 384/220–222

[56] References Cited

U.S. PATENT DOCUMENTS

| 3,147,964 | 9/1964 | Wolf | 267/292 |
|---|---|---|---|
| 4,195,887 | 4/1980 | Ruddell | 267/281 |
| 4,278,271 | 7/1981 | Raidel | 280/687 |
| 4,316,643 | 2/1982 | Burk et al. | 267/258 |
| 4,471,935 | 9/1984 | Chiba et al. | 267/141.2 |
| 4,981,308 | 1/1991 | Kunert et al. | 267/293 |
| 4,984,928 | 1/1991 | Domer | 403/228 |

FOREIGN PATENT DOCUMENTS

| 0517722 | 6/1957 | Italy | 267/292 |
|---|---|---|---|
| 0051538 | 3/1991 | Japan | 267/141.2 |

Primary Examiner—Robert J. Oberleitner
Assistant Examiner—Chris Schwartz
Attorney, Agent, or Firm—Seed and Berry

[57] ABSTRACT

A vehicle dual axle suspension comprising a force transmitting structure connected at one end thereof to a forward axle of the vehicle, and at the opposite end thereof to the rear axle, and a central resilient bushing for fastening the force transmitting structure to a cross member of the frame of the vehicle at the mid-point of the force transmitting structure. In one embodiment, the force transmitting structure is a spring plate having a relatively small thickness extending in the vertical direction of the vehicle and having a relatively large width extending in the transverse direction with respect to the vehicle. Other embodiments include resilient bars, and rigid arms pivotally attached to one another. The forward and rear axles are permitted to move substantially independently of one another in the vertical direction as necessary to provide a soft ride when traveling down the highway. In contrast, the force transmitting structure has a relatively high horizontal stiffness such that the suspension is extremely stiff in roll about the longitudinal roll axis of the vehicle. Slew control rods are provided to limit the rotation of the force transmitting structure about the fore-aft axis of the bushing. The central resilient bushing has a sinusoidal height variation with the minimum height being at the fore and aft locations and the maximum heights being transversely spaced from one another. A suspension using pivotally connected suspension beams in which primary shock absorbers control one vibration mode between the axles and the vehicle and a second shock absorber is connected between the suspension beams to dampen a second vibration made between the axles and the vehicle.

18 Claims, 7 Drawing Sheets

Figure 8
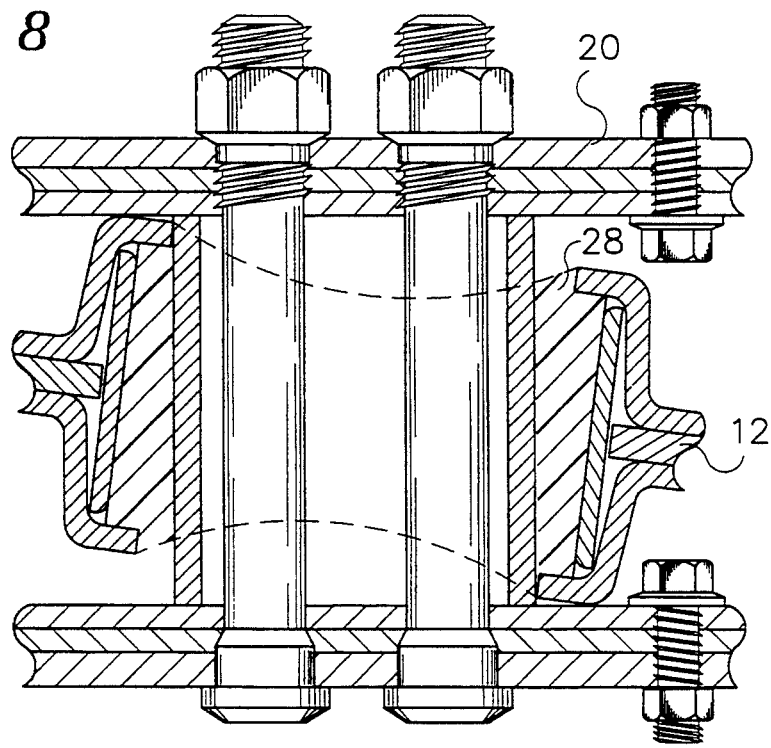
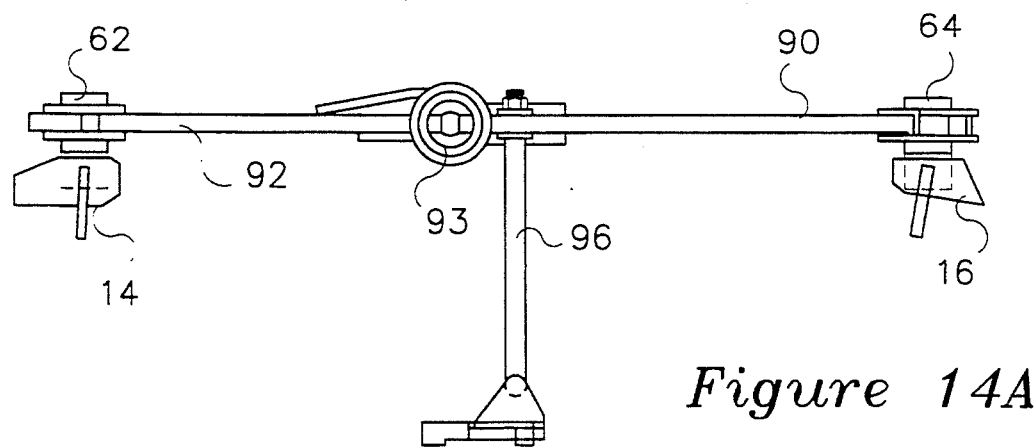
Figure 14A
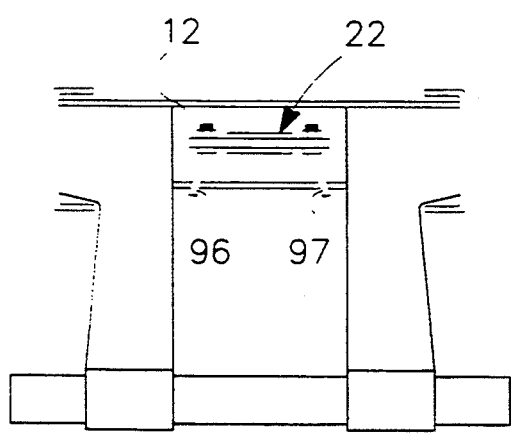
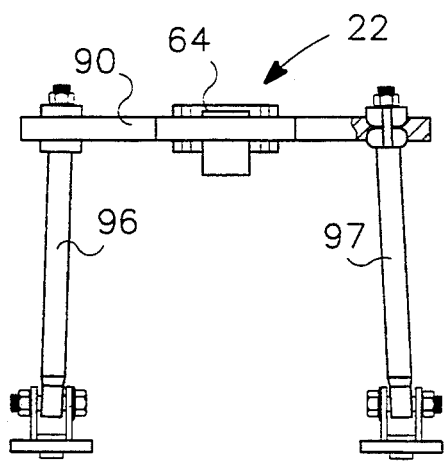
Figure 14C
Figure 14B

VEHICLE SUSPENSION

CROSS-REFERENCE TO RELATED APPLICATION

This application is a division of U.S. patent application Ser. No. 07/678,017, filed Apr. 1, 1991, now U.S. Pat. No. 5,186,485.

TECHNICAL FIELD

The present invention relates to a suspension system for vehicles, and more particularly, to a more easily manufactured suspension stabilizing linkage system including various embodiments thereof, designed to provide increased roll stability and improved ride to vehicles such as tractor-trailer combinations. The invention also relates to unique components of such a system such as a variable conical rate central bushing, slew control rods, and varied shock absorption actuators.

BACKGROUND OF THE INVENTION

In the design of suspension system, there are two competing concerns. The first concern is that the ride be "soft" in order to obtain maximum comfort for the driver, as well as to prevent damage to cargo, for instance. Thus, tractor-trailer combinations utilize air suspension systems in order to achieve this "soft" ride. The second competing concern is that the vehicles be able to corner well without substantially displacing the center of gravity of the vehicle in order to maintain vehicle roll stability. Therefore, it is desirable that the suspension be relatively "soft" in the vertical direction and yet stiff in roll in order to provide good cornering characteristics.

U.S. Pat. No. 4,667,974, issued to Giese, is directed towards a vehicle suspension system designed to provide high roll stability and a soft ride. The details of this patent are incorporated herein by reference thereto.

Suspensions sometimes employ rubber or other elastomeric vertical bushings. These bushings generally are uniform in height and horizontal cross section thickness. These bushings thus react to loads generally equally in all horizontal and angular directions.

Suspensions usually provide one set of damping devices, such as shock absorbers, that dampen only one type of axle motion. This allows other types of axle motion to occur undampened or not optimally dampened.

SUMMARY OF THE INVENTION

The present invention is directed towards a vehicle suspension which is designed to enhance the suspension characteristics disclosed in the Giese patent and provide improved alternative embodiments employing principles of the Giese patent. More specifically, one feature of the present invention is directed towards a vehicle suspension comprising a spring plate or other relatively stiff lateral and fore-and-aft force transmission mechanism connected at one end thereof to a forward axle of the dual axle vehicle suspension, and at the opposite end thereof to the rear axle of the suspension, and a central bushing for fastening the spring plate to a cross member of the frame of the vehicle at the mid-point of the spring plate. A flat spring plate is used in a preferred embodiment and is designed like a leaf spring having a relatively small thickness extending in the vertical direction of the vehicle and having a relatively large width extending in the transverse direction with respect to the vehicle.

Since the thickness of the spring plate is relatively thin in the vertical dimension, the ends of the spring plate are relatively flexible in the vertical direction. Accordingly, the forward and rear axles are permitted to move substantially independently of one another in the vertical direction as necessary to provide a soft ride when traveling down the highway. In contrast, the relatively large width of the spring plate in the horizontal dimension results in a spring plate having a lateral stiffness such that the suspension is stiff in roll about the longitudinal roll axis of the vehicle.

A central bushing secures the spring plate to the chassis frame cross member and is uniquely designed to allow the entire spring plate to pivot about a transverse axis of the bushing with little resistance but yet to be stiff against lateral movement of the spring plate about the longitudinal roll axis of the vehicle and also limits rotation of the spring plate about the fore-aft axis of the bushing parallel to the longitudinal axis of the vehicle. That is, the bushing has high rotational stiffness for lateral motion about the longitudinal roll axis of the vehicle and high rotational stiffness about an axis for and aft through the bushing. The bushing has substantially less rotational stiffness about the vertical and transverse axes of the bushing.

The central bushing includes a cylindrical inner member which is adapted to be connected to the frame, a cylindrical outer member circumscribing the inner member and adapted to be connected to the spring plate, and elastic control means disposed between the inner and outer members for controlling the rotation of the inner and outer members with respect to one another.

The control means comprises an annular elastomeric member having substantially the same height dimension around the circumference thereof as the outer member. The height dimension of the outer member and the elastomeric member varies along the circumference thereof. In particular, the height dimension of the outer member and elastomeric member varies in a sinusoidal manner so as to include two opposing maximum height areas and two opposing minimum height areas disposed at right angles with respect to one another. The two opposing maximum height areas are provided along the transverse axis to provide increased lateral load-bearing capacity and increased rotational stiffness about the longitudinal axis of the vehicle as is caused in an impending vehicle roll-over condition. The two opposing minimum height areas are provided in the longitudinal fore-and-aft axis through the bushing to allow freedom of vertical movement of the fore-and-aft ends of the spring plate by being less stiff in rotational movement in the direction parallel to the transverse axis of the vehicle. In this manner, pivotal movement of the frame member with respect to the axles is stiffer about the longitudinal axis of the vehicle than about the transverse axis of the vehicle. The degree of stiffness about the longitudinal and transverse axes is controlled by varying the minimum and maximum height dimensions of the outer member and the elastomeric member.

It should be -understood that the frame or chassis of the vehicle at impending roll-over, as when moving around a sharp curve, places a large lateral load through the inner member to the outer member and thus to the laterally stiff wide spring plate. The large elastomeric load bearing area handles this lateral load which can reach 50,000 lbs. lateral force. This lateral load is caused by the frame trying to rotate about the longitudinal roll axis of the vehicle which on this suspension is defined by track rods below the axles causing the center of roll to be below the axles. Thus, the long pivot radius from the chassis to the lower roll axis causes the central bushing to experience primarily a lateral horizontal load. If the wheels on both sides of the axles area raised, rotational movement of the inner member about the central bushing in a direction about a fore-aft axis through the bushing is also experienced. This rotational motion about the bushing is also resisted by the higher elastomeric height on the transverse sides of the bushing. Thus, the higher vertical transversely spaced sides of the bushing resists both lateral forces and the rotational motion.

As thus far described, the spring plate and central bushing can uniquely function separately in other suspensions and synergistically together. Thus, the invention is not to be limited to the combinations of the spring plate and bushing.

Other forms of suspension assemblies include, for example, a rigid plate vertically slidable on a rigid frame pin, a two bar linkage, and an articulated two piece rigid plate.

The suspension is shown with air springs, but also can function advantageously with conventional coil springs or with leaf springs used instead of pivotal suspension beams.

The suspension when used with pivotal suspension beams may advantageously be coupled to a unique horizontally disposed shock absorber coupled between the beams to dampen bounce motion of the axles as a complement to the normal vertical shock absorber coupled between the axles and the frame to dampen both bounce motion and pitch motion of the axles.

BRIEF DESCRIPTION OF THE DRAWINGS

FIG. 8 is a cross-sectional view taken along line 8—8 of FIG. 3 of the bushing deflected about the longitudinal axis of the vehicle as when the ends of the axles are raised relative to the frame on one side of the vehicle and a lateral load has been applied to the frame from the right in FIG. 8;

FIG. 14A is a fragmentary schematic side elevation of the embodiment of FIG. 14; and FIG. 14B is a fragmentary schematic end elevation with parts in section of the embodiment of FIG. 14.

FIG. 14C is a fragmentary schematic end elevation of another embodiment showing slew control rods with the embodiment of FIG. 1.

DETAILED DESCRIPTION OF THE INVENTION

Figure 1:
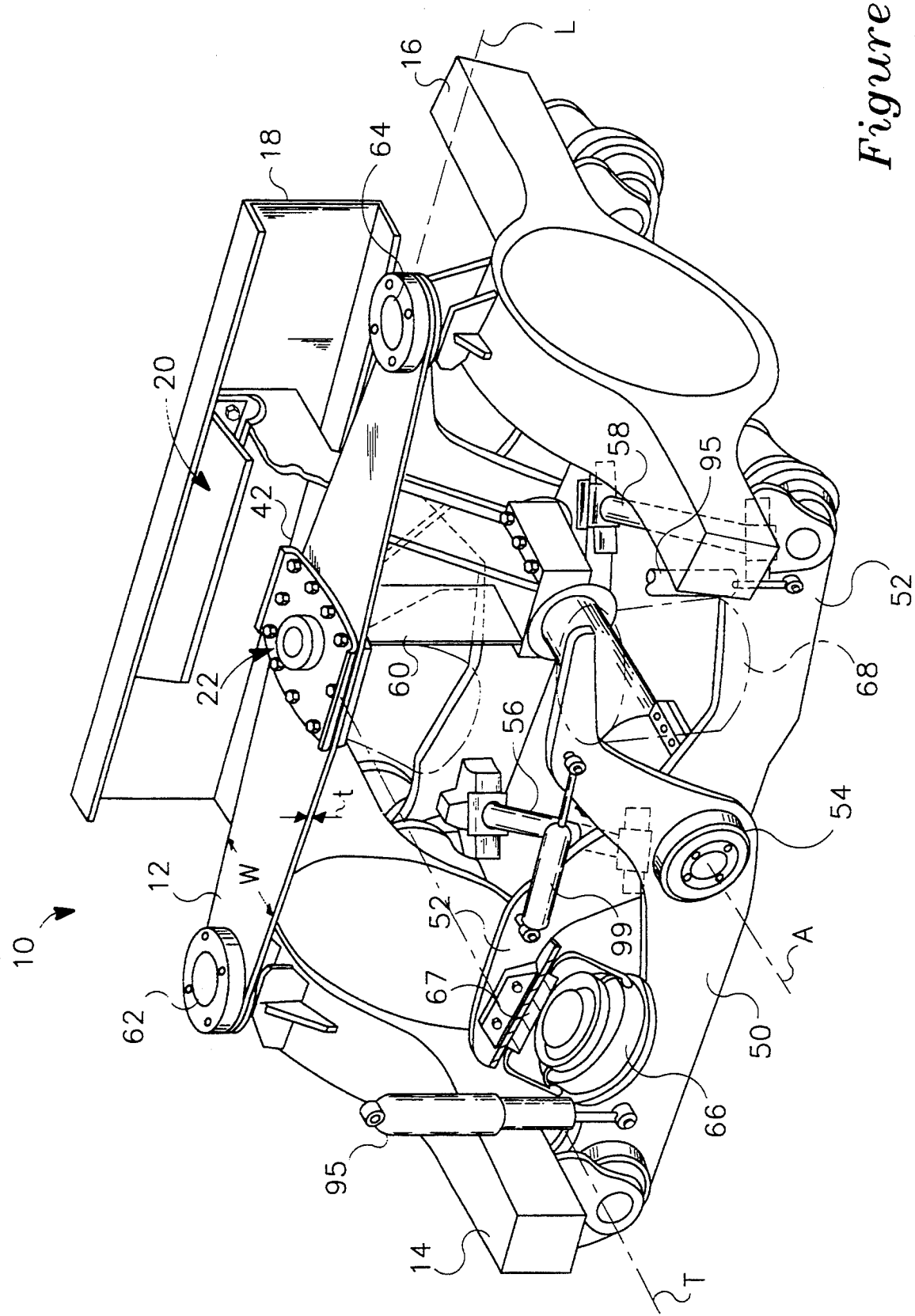
FIG. 1 is an isometric view of the suspension system according to the present invention.

FIG. 1 is an isometric view of the suspension system of a preferred embodiment of the invention. Referring thereto, the suspension system 10 includes a spring plate 12 connected at one end thereof to a front axle 14 and at the other end thereof to a rear axle 16. The frame 18 of the vehicle includes a cross frame 20 to which the mid-portion of the spring plate is attached using a unique central bushing 22, described in more detail below.

Figure 2:
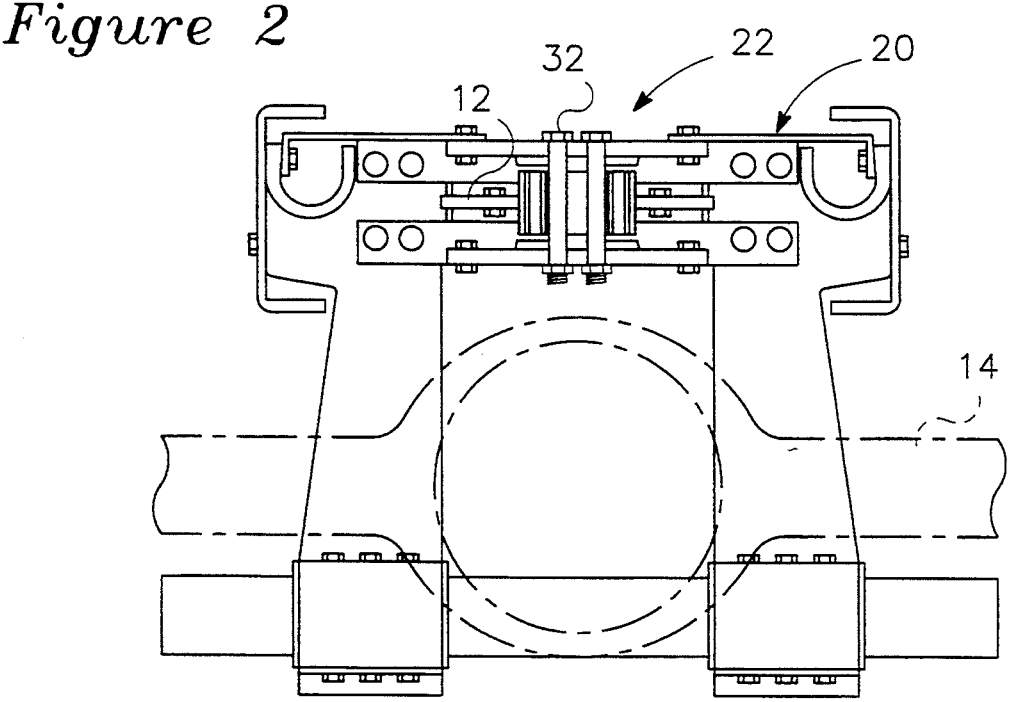
FIG. 2 is a transverse vertical section.
Figure 3:
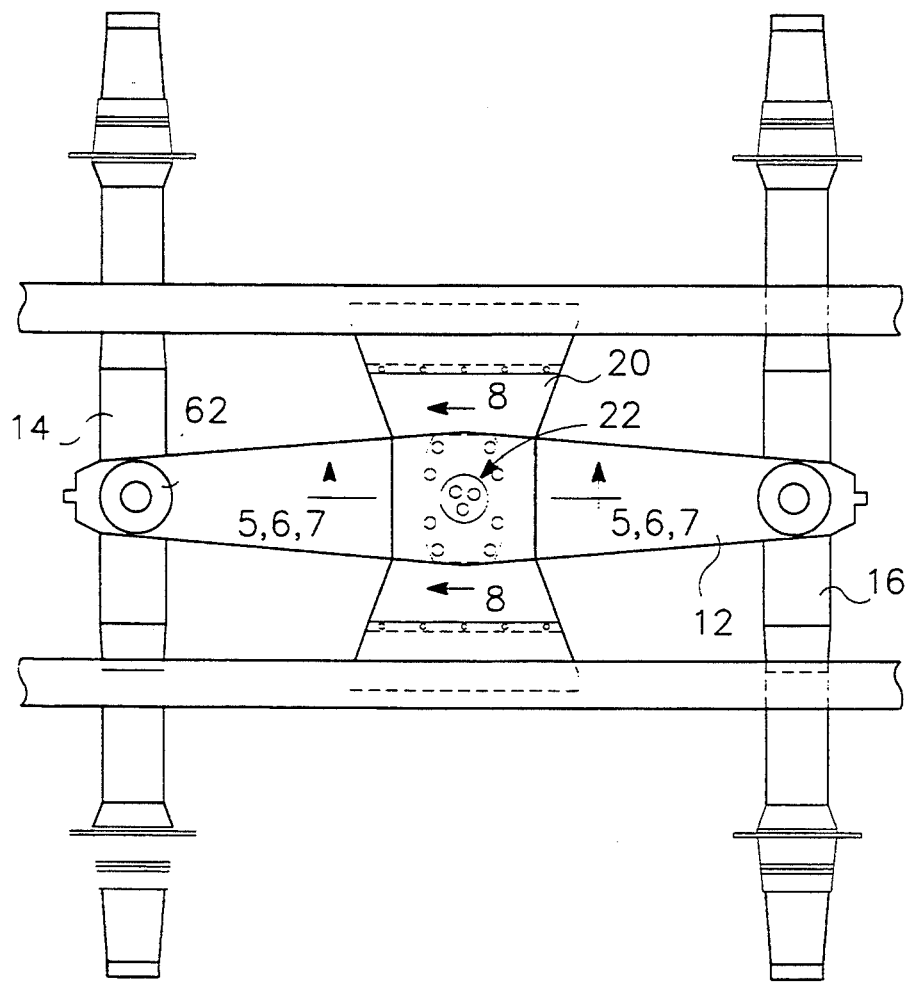
FIG. 3 is a top view of the suspension system of the present invention.

As illustrated in FIGS. 1 and 2, the spring plate 12 has a relatively small thickness t as compared to its width w. Due to its relatively small thickness t, the ends of the spring plate are relatively flexible vertically about a transverse axis of the central bushing 22. This flexing is called "suspension travel."Therefore, the axles 14, 16 are able to move substantially independently of one another in the vertical direction. Thus, the spring plate 12 does not interfere with the vehicle's spring system, such as the vehicle air suspension, and therefore does not adversely affect the "soft" ride of the vehicle. Furthermore, since the height of the elastomer in the bushing is lowest at the fore-and-aft sides of the bushing, the spring plate can tilt about the transverse axis of the bushing. This is called "suspension articulation."

However, the relatively large width dimension w of the spring plate results in a spring plate which is horizontally laterally and longitudinally stiff. The suspension is provided with lower track rods 56 and 58 that are respectively pivotally coupled to a trunion bracket 60 and to the axles. This causes the longitudinal roll axis L of the vehicle to be quite low and beneath the axles. The laterally stiff spring plate and the height of the elastomer make the suspension stiff in roll about the vehicle roll axis. These track rods complement the spring plate which itself acts as a longitudinally stiff track rod between the tops of the axle bowls of the axles to resist torsional loads caused by braking and traction forces.

Figure 4:
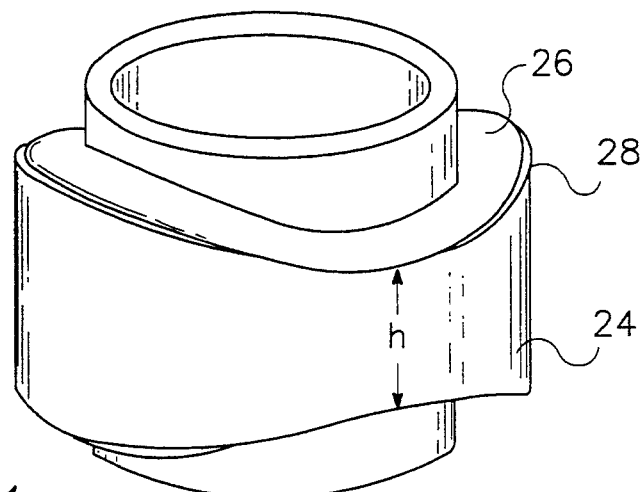
FIG. 4 is an isometric view of the varying conical stiffness central bushing according to the present invention.
Figure 5:
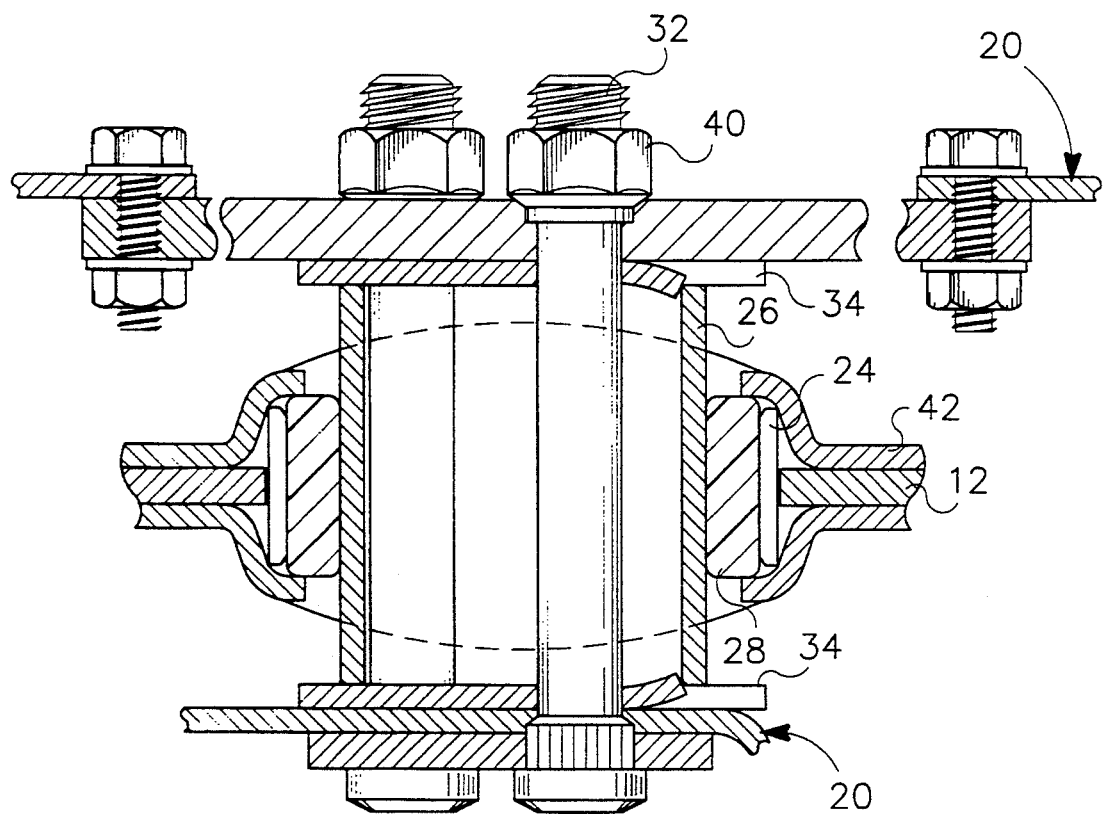
FIG. 5 is a cross-sectional view taken along line 5—5 of FIG. 3 of the bushing in an installed state.

FIGS. 4 through 8 specifically illustrate the central bushing 22. Referring first to FIGS. 1, 4 and 5, the bushing 22 is designed to be laterally stiff against lateral rotation of the frame about the longitudinal roll axis of the vehicle and torsionally compliant about a transverse axis T through the bushing. The bushing 22 includes a radially outer member 24, a radially inner member 26, and elastomeric member 28 bonded to the inner member and pressed into the outer member. The inner member, outer member and elastomeric member are each tubular in shape. The height h of the elastomeric member 28 and outer member 24 varies along the circumference thereof. In particular, in the fore-and-aft direction along a longitudinal axis L, the height of the outer member 24 and the elastomeric member 28 is at a minimum while in the transverse direction along transverse axis T the height is at a maximum. The changing dimension of the height h is substantially sinusoidal as illustrated. According to a preferred embodiment of the invention, the inner and outer members are made out of steel.

This unique bushing shape results in a bushing having varying stiffness characteristics about different axes. For instance the rotational or pivotal stiffness about the fore-and-aft axis L of the bushing is at a maximum due to the relatively large dimension of the height h of the outer member 24 and elastomeric member 28 along the transverse axis T. Furthermore, the lateral load-bearing capacity of the bushing is also at a maximum when subjected to roll over loads about the longitudinal roll axis of the vehicle. Contrastingly, the rotational or pivotal stiffness about the transverse axis of the bushing is at a minimum due to the relatively small dimension of the height h of the outer member 24 and elastomeric member 28 along the fore-and-aft axis L. The specific stiffness of the bushing can be controlled by varying the minimum and maximum height dimensions of the elastomeric member 28 and outer member 24 and by the choice of elastomeric materials.

FIG. 5 illustrates the bushing in an undeflected condition installed in the suspension system with the bushing fore-and-aft axis extending left to right. Referring thereto, the tubular inner member 26 is fixedly secured to the cross frame 20 of the vehicle frame utilizing bolts 32 extending through the interior of the inner member, as illustrated. The bolts 32 pass through a bracket bolted to the cross frame 9-0. Upper and lower wear plates 34 engage the ends of inner member 26. Nuts 40 threadedly secure the bolts. The outer member 24 is fixedly secured to the spring plate 12 of the vehicle by a retaining member 42.

Figure 6:
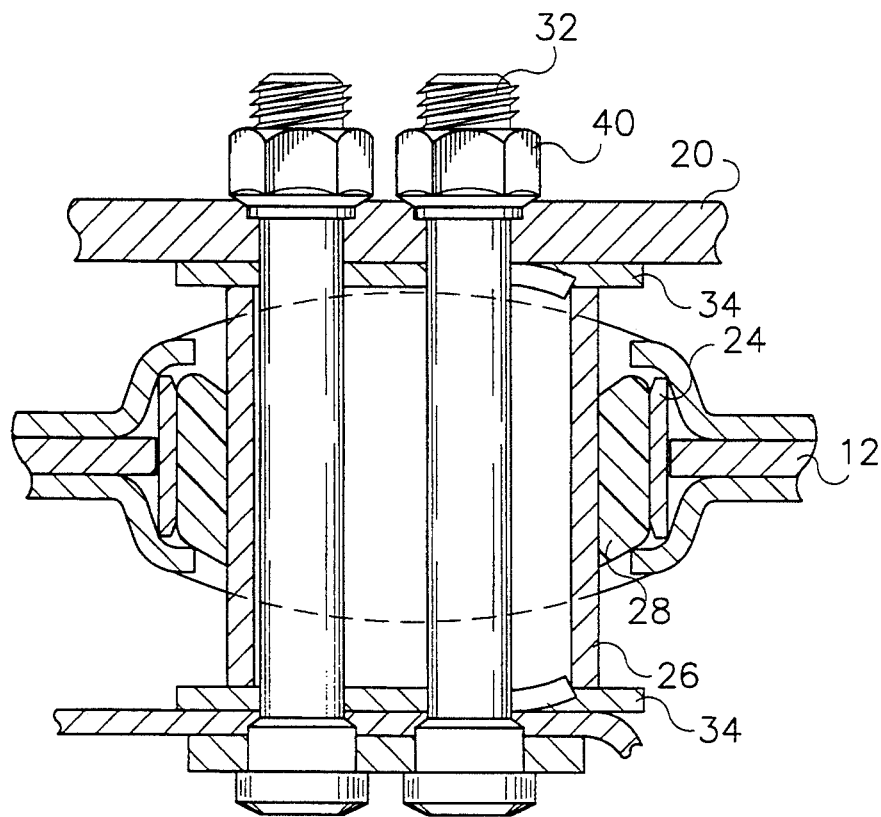
FIG. 6 is a cross-sectional view taken along line 6—6 of FIG. 3 of the bushing experiencing an upward force thereon as shown also in FIG. 9.
Figure 7:
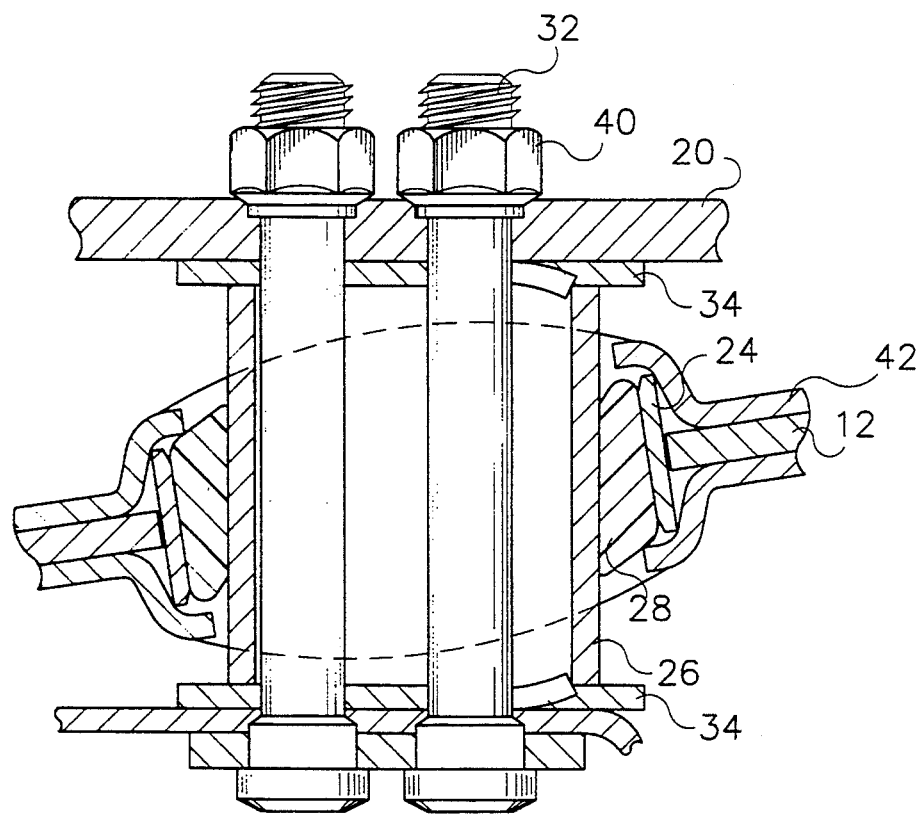
FIG. 7 is a cross-sectional view taken along line 7—7 of FIG. 3 of the bushing deflected about the transverse axis as shown in FIG. 10.

FIGS. 6 through 8 illustrate the deflection of the bushing 22 under various loading conditions. As noted above, FIG. 6 is a longitudinal side view of the bushing specifically illustrating vertical deflection of the elastomeric member 28 when, for instance, there is no air in the vehicle air springs 66 and 68. As shown therein, the inner member 26 moves downwardly with the inner circumferential portion of the elastomeric member 28 moving downwardly and the outer circumferential portion of the elastomeric member 28 and outer member 24 remaining in the same vertical location. The retaining member 42, which is noted above is preferably made out of steel, provides a positive stop by abutting against wear plates 34 attached to the cross frame 20 of the vehicle frame.

FIG. 7 illustrates the bushing where the spring plate 12 is rotated with respect to the cross frame 20 of the vehicle frame about the transverse axis T. It can be seen that the stiffness of the bushing resisting rotational motion about the transverse axis is relatively soft, thereby allowing the spring plate 12 to rotate relatively freely about the transverse axis.

As shown by FIG. 8, the stiffness of the bushing resisting rotation about the fore-and-aft axis of the bushing is relatively stiff due to the increased height of the outer member 24 and elastomeric member 28. Referring to FIG. 8, the maximum angle of rotation about the fore-and-aft axis of the bushing permitted by the bushing outer member and wear plate 34 is a smaller angle than the maximum angle of rotation about the transverse axis of the bushing as shown in FIG. 7.

One central bushing design is built to withstand over 50,000 lbs. lateral force at impending vehicle roll-over. The flexibility required from the central bushing is plus or minus twelve and one half degrees rotation about a vertical axis and plus or minus eleven degrees conical rotation about a transverse axis.

The suspension is in one embodiment provided with lower scissor suspension beams 50 and 52 on each side of the chassis pivotally secured to respective axles 14 and 16, and pivotally secured to a trunion tube 54. The axles 14 and 16 are located laterally in the suspension by track rods 56 and 58, located below the chassis frame 18. The track rods are each pivotally connected at one end to a respective suspension beam at or near the axle and at the other end are pivotally connected to a trunion bracket 60 (only one shown for clarity) secured to the chassis frame 18.

The spring plate 12 is pivotally attached at its opposite ends to resilient bushings 62 and 64 connected to the axle bowls of axles 14 and 16. The suspension beams support the chassis through air springs 66 and 68.

Movement of the axles 14 and 16 relative to the chassis 18 is defined by two modes of operation. They are suspension travel and suspension articulation.

The chassis is weight is supported by the suspension beams 50 and 52. The weight of the vehicle and vertical loads cause the beams to rotate in opposite directions. Air springs 66 and 68 counteract this motion by acting between the beams to support the chassis weight. When the chassis moves up or down relative to a horizontal ground plane the beams rotate counter to each other in a scissors fashion. This is what is called suspension travel. Suspension articulation is when both beams rotate in the same direction. This is the case for an uneven ground condition. The height of the chassis above the "average" ground level has not changed but the suspension has articulated about the trunion tube to the ground profile.

There are infinite combinations of suspension travel and articulation possible for each pair of suspension beams. The combinations of travel between the right and left suspension beam pairs, and the combinations of articulation between the right and left beam pairs, are substantially influenced by the spring plate. To distinguish between travel and articulation the following method is used: a line drawn from the beam end bushing on the forward axle 14 to the beam end bushing on the rear axle 16 passes through the trunion 54 center point and is horizontal if the suspension is at the design ride height and on level ground. For suspension travel the line is displaced up or down from the trunion center point. For suspension articulation the line changes angle about the trunion pivot point with respect to the horizontal. With any combination of travel and articulation the components can be separated using this method.

Figure 9:
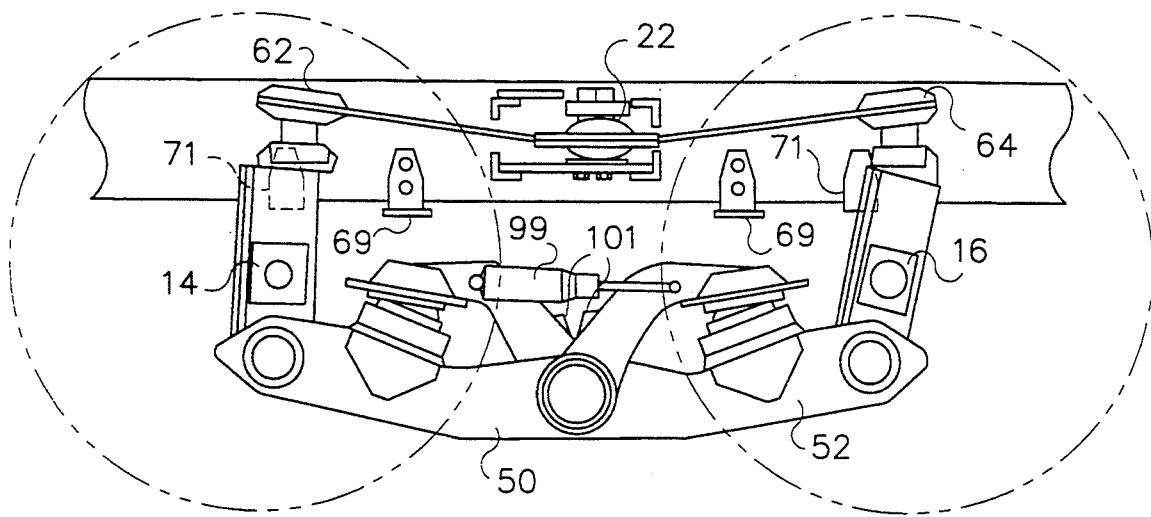
FIG. 9 is a schematic side elevation showing the axles simultaneously applying upward forces on the suspension to cause "suspension travel;"
Figure 10:
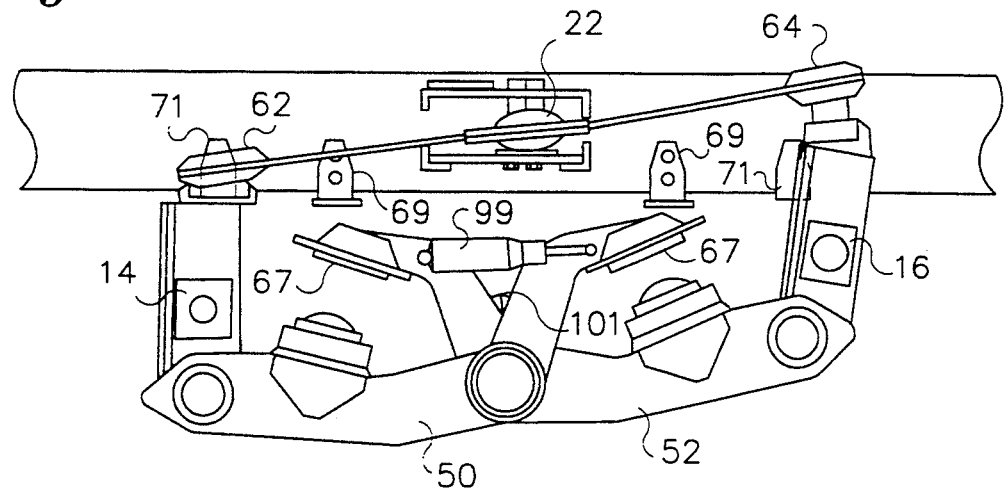
FIG. 10 is a schematic side elevation showing the rear axle raised to cause "suspension articulation" about the central bushing.
Figure 11:
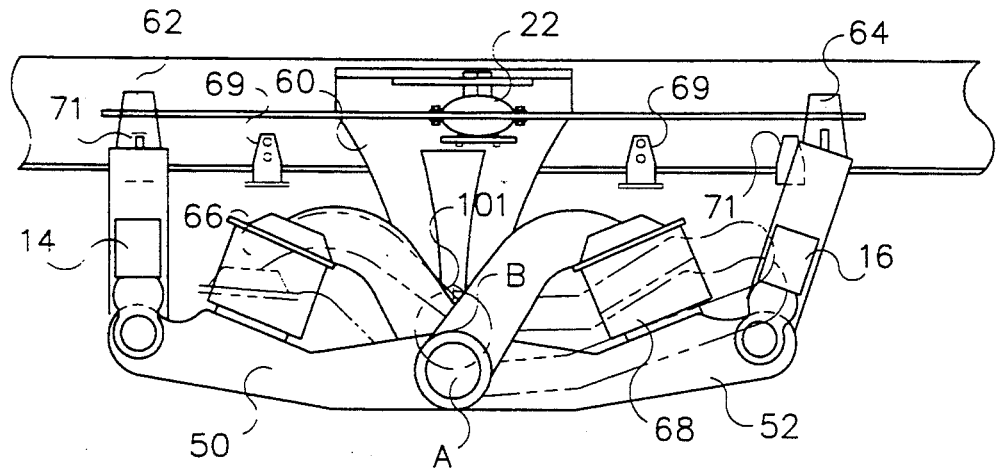
FIG. 11 is a schematic side elevation again showing suspension travel in one phantom line position and suspension articulation in a second phantom line position.

Stated differently, when the vehicle rear axle encounters a bump for example, the rearward axle 16 moves up, pivoting the beams about the central axis A (FIG. 1) of the trunion tube 54 until stops 67 in the air spring stop further compression of in the air springs. This is suspension travel and is illustrated in heavy dashed-dot lines in FIG. 11 and as shown in FIG. 9. The spring plate 12 will flex about 2% inches upwardly rearward of the central bushing 22 and not provide major resistance to the upward movement of the axle. The driver will thus experience a soft ride. Thereafter, a further rise in the rear axle 16 causes the trunion tube and chassis to raise relative to the front axle. This is suspension articulation and is illustrated in light dashed-dot lines in FIG. 11. Also note the transverse axis position A of the trunion tube 54 has now moved upwardly to position B.

The opposite motions occur when the forward axle is moved in the up direction.

The stops 67 in the air springs prevent excessive suspension travel which limits upward flexing of the spring plate 12. Stops 69 and 71 on the chassis prevent excessive suspension articulation. Stops 101 (FIG. 9) between the beams 50 end 52 limit movement of the beams apart to limit downward flexing of the ends of the spring plate 12. Construction in one embodiment provides about five inches of suspension travel and about ten inches of suspension articulation.

It is important to note that within the allowable limits of axle motion the suspension travel is less than the suspension articulation. For example: from design height both axles can move upward a total of $2\frac{1}{2}''$ before encountering the bump stop 67 internal to the air springs. There is still about $1\frac{1}{2}''$ above both axles to the frame rail stops 71. Further motion of one axle upward requires the other axle to move downward. Motion in the opposite direction is identical but the stops are different. The beams 50 and 52 have an interlock for the vertical travel at $2\frac{1}{2}''$ downward and the vertical shock absorbers 95 (FIG. 1) limit total articulation in another $1\frac{1}{2}''$.

The importance of the suspension travel limit within the total travel is that it allows the spring plate to function without being overstressed by excessive bending deflection. It also allows for much shorter air spring members to accommodate much greater suspension articulation.

In encountering a cross articulation situation, such as crossing a diagonal drain ditch, the axles pivot about the track rods and the spring plate rotates horizontally about the central bushing 22 with the tops of the axle bowls, thus allowing the suspension load to be evenly distributed between both ends of each axle.

In encountering a bump in the road causing one end of one axle to rise, the axle pivots about its track rod, causing the top of the axle bowl on that axle to move slightly laterally. This causes the entire spring plate to rotate about the vertical axis of the central bushing, resulting in the opposite end of the spring plate moving laterally and pivoting the opposite axle in the direction opposite to the first axle. This spring plate motion thus distributes the upward force on one wheel of one axle over the three other wheels of the suspension. The result is better traction and less dynamic pressure on the tires.

When the vehicle encounters an impending roll-over situation the spring plate and bushing will remain very stiff resisting such roll-over.

Figure 12:
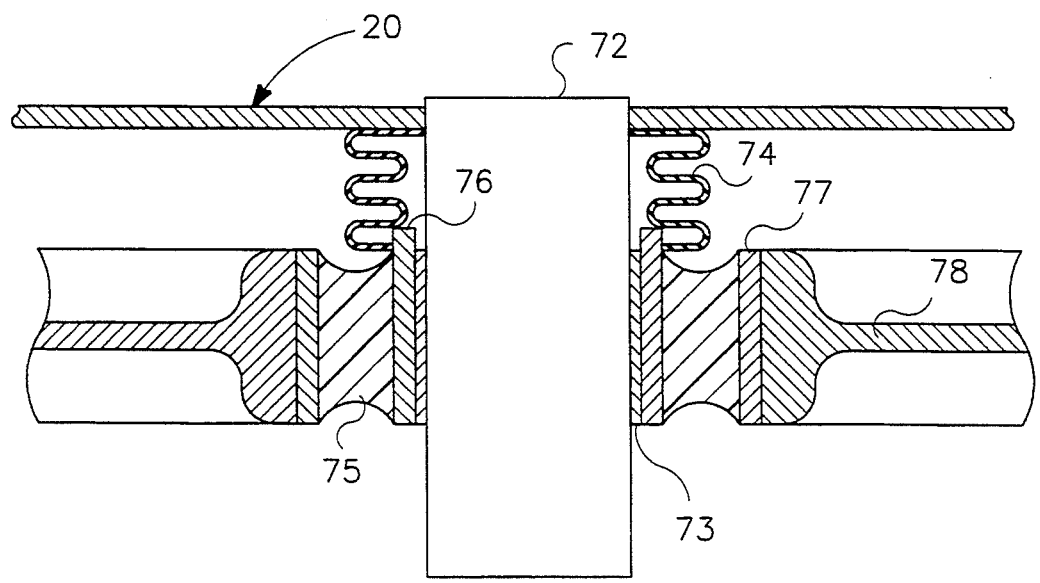
FIG. 12 is a longitudinal fragmentary vertical section of second embodiment.

FIG. 12 shows another embodiment of the suspension. In this embodiment a king pin 72 is fixed to a cross frame of the chassis 18. A bronze bushing 73 slides on the pin which is coated with grease confined in a grease cover 74. A rubber bushing 75 secured to inner member 76 and outer member 77 is fixed to the bronze bushing. A rigid plate 78 is fixed to the outer member and is secured at its fore-and-aft ends to bushings 62 and 64 on the axle bowls of axles 14 and 16 as in FIG. 1.

In this embodiment, vertical movement of the axles results in vertical sliding of the bronze bushing 73 and inner member 76 on the pin 72. Cross articulation of the plate 78 occurs by the horizontal rotation of the plate about the pin 72.

Figure 13:
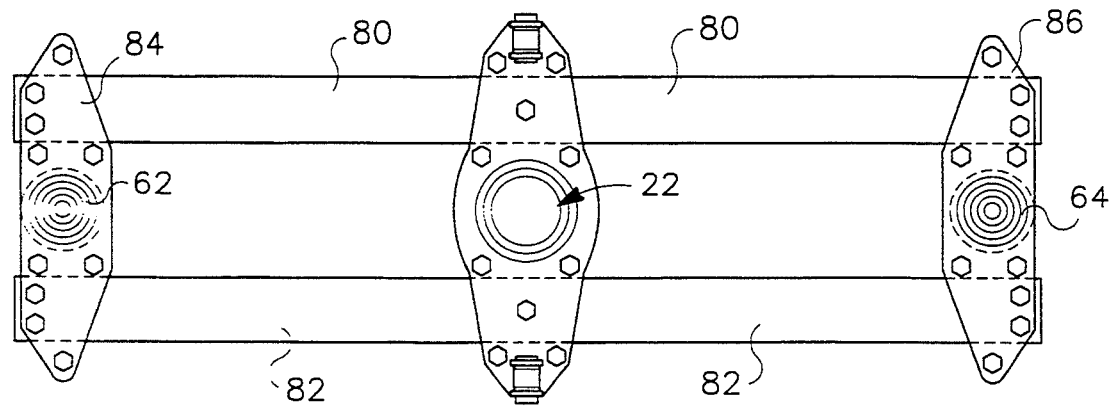
FIG. 13 is a schematic plan view of a third embodiment.

FIG. 13 shows an embodiment in which the central bushing 22 is fixed to two spaced flexible bars 80 and 82. These bars are fixed to brackets 84 and 86 which are fixed to bushings 62 and 64. The bars flex vertically as does spring plate 12. The central bushing 22 functions also as in the embodiment of FIG. 1.

Figure 14:
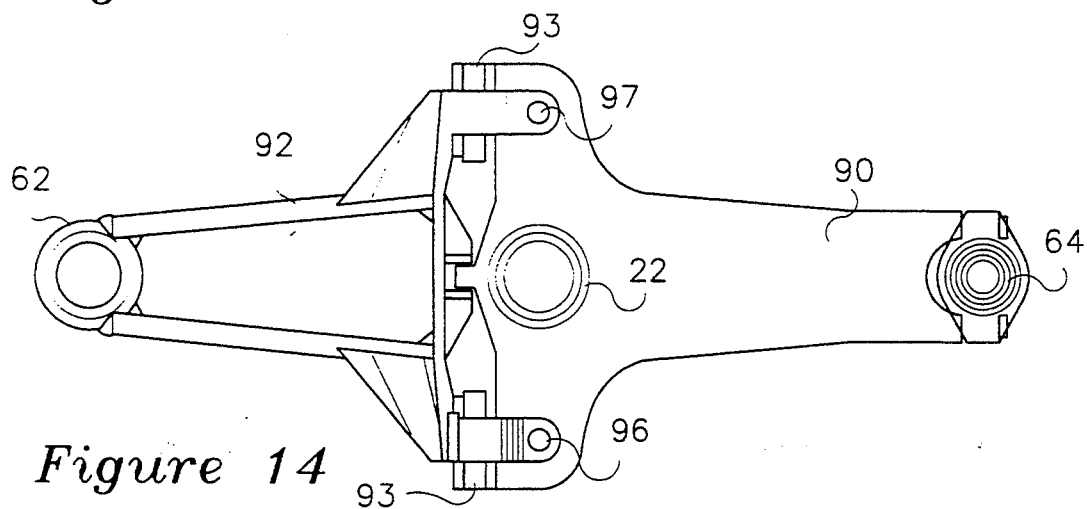
FIG. 14 is a schematic plan view of a fourth embodiment.

FIGS. 14, 14A and 14B show an embodiment in which the central bushing 22 is mounted in a rigid rear arm 90. The arm 90 is connected at one end to bushing 64 that is secured to the axle bowl of axle 16 as in FIG. 1. The opposite end of rear arm 90 is pivotally connected to a rigid forward arm 92 by horizontal transverse pivot pins 93. The forward end of the forward arm is connected to bushing 62 that connects to the axle bowl of forward axle 14.

FIG. 14C shows the embodiment of FIG. 1 with slew control rods 96 and 97 connected to the spring plate 12.

Vertical movement of the axles articulates forward arm 92 about the pivot pins 93 or articulates rear arm 90 about the central bushing 22. Cross articulation occurs by pivoting the arms about the inner member 26 as in FIG. 1.

A set of slew control rods 96 and 97 that pivotally connect at their upper ends to rear arm 90 along a transverse line through the center of the bushing 22 and pivotally connect at their lower ends to the bracket 60 fixed to the chassis 18. The upper connection between the slew control rods and the arm 90 is with a conventional shock absorber bayonet-type connection employing rubber donut bushings trapped between washers. This connection allows limited resilient vertical movement of from about $\frac{1}{8}$ to $\frac{1}{4}$ inch between the arm and the slew rods as well as limited universal articulation in all horizontal directions. These slew control rods may be used with any of the embodiments disclosed (for example as shown in FIG. 2), except the embodiment of FIG. 12, and prevent rotation of the spring plate 12, the flexible bars 80 and 82, or the rigid arms 92 and 90 about the fore-and-aft axis of the central bushing. While the slew rods prevent rotation about the fore-and-aft axis of the bushing, the pivotal connections of the slew rods to rear arm 90 and the chassis 18 at the central transverse axis of the bushing allows free rotation of the spring plate 12, the bars 80 and 82, or the arms 92 and 90 about the central bushing.

As can be seen by the foregoing, the present invention provides a unique bushing which can be used in a vehicle suspension for providing stiffness about the fore-and-aft axis of the bushing and with the horizontally stiff spring plate or other embodiments provides superior roll-over stiffness. The stiffness is provided while allowing suspension flexibility about the transverse axis of the vehicle to enable the front and rear axles to independently absorb bumps while travelling along a road.

The arrangement of this suspension allows the amount of damping provided by shock absorbers also to be uniquely different for the two principal modes of suspension movement. The two modes are the bounce mode, also called suspension travel herein, and the axle pitch mode, also called suspension articulation herein. The bounce mode is exercised when the suspended frame 18 is moved up and down with respect to both axles 14 and 16. This causes the scissor cross suspension beams 50 and 52 to alternately compress and extend the air springs 66 and 68.

The pitch or articulation mode is exercised when the beams pivot in unison around their common central trunion tube 54 and one axle displaces in an upward direction while the other is displacing down. The air springs do not compress or extend during movement in this mode.

On other suspensions, it is only possible to connect damping mechanisms (shock absorbers) between the axles, or some structure connected more or less rigidly to the axles, and the vehicle frame. These other suspensions typically have two modes of movement, either the same as described above or similar. That is, all have a bounce mode and a mode of axle movement, typically called the axle hop mode which, depending upon suspension geometry, may or may not be identical to the pitch mode described above, but is equivalent. On typical suspensions, damping for both modes is provided by the same shock absorber, commonly located between the axle and frame as described above. The amount of damping provided on these suspensions is a compromise between the ideal amount to control axle hop and the ideal amount to control bounce motion. The ideal damping forces to control each of these modes is very different, the bounce mode always needing the greater damping force due to its lower frequency and the higher mass involved in its motion.

This compromise of damping force levels assures that an optimum vehicle ride is not obtainable from a typical suspension. The suspension arrangement of this invention allows the damping force for each principal mode of movement to be set independently of the other.

The pitch mode damping is provided by shock absorbers 95 connected in the common way between the axles 14 and 16 and the vehicle frame 18. These shock absorbers can be set for the ideal damping force to control the suspension pitch or axle hop mode of movement. The scissor suspension beams 50 and 52 of this suspension arrangement allow shock absorber 99 to be mounted substantially horizontally between the beams just above the beam pivot on the trunion tube 54. This shock absorber or shock absorbers if on both sets of beams are actuated only in the bounce mode when the beams pivot opposite to one another, and the air springs are compressed or extended.

The damping in the bounce mode is therefore the sum of the damping provided by the shock absorbers 95 used to control the pitch mode and the horizontal shock absorber or absorbers 95 mounted between the beams. The ideal damping force in the bounce mode can then be employed by sizing the horizontal shock absorber 67 to make up the difference between the damping required to control the pitch mode ideally, and the amount of damping required to control the bounce mode ideally.

It will be appreciated that, although specific embodiments of the invention have been described herein for the purpose of illustration, various modifications may be made without departing from the spirit and scope of the invention. Accordingly, the invention is not to be limited except as by the appended claims.

We claim:

1. An elastomeric bushing for an axle suspension on a wheeled vehicle, comprising:
    a rigid inner member adapted to be connected to a frame of the vehicle:
    a rigid outer member circumscribing the inner member and adapted to be connected to an elongated body, the inner and outer members extending in the vertical direction;
    control means disposed between the inner and outer members for controlling conical rotational movement of the elongated body with respect to the frame such that conical rotational movement of the elongated body with respect to the frame about a radial fore and aft axis through the bushing is stiffer than conical rotational movement of the elongated body with respect to the frame about a radial transverse axis of the bushing; and
    a slide means disposed within the inner member, the slide means allowing the inner member to slide vertically with respect to the frame.

2. The bushing of claim 1 wherein the slide means includes a pin connected to the frame and bearing means disposed between the pin and the inner member for allowing the inner member to slide vertically with respect to the pin.

3. The bushing of claim 2 wherein the bearing means includes a bushing affixed to the inner member such that the inner member slides vertically with the bushing with respect to the pin.

4. An elastomeric bushing for an axle suspension on a wheeled vehicle, the bushing having a fore and aft axis and a transverse axis transverse to the fore and aft axis, comprising:
    a rigid cylindrical inner member having a vertical axis and adapted to be connected to a frame of the vehicle;
    a rigid cylindrical outer member having a vertical axis coincident with the vertical axis of the inner member and circumscribing the inner member and adapted to be connected to an elongated body, the height of said outer member in the vertical direction varies along the circumference thereof sinusoidally, the inner and outer members extending in the vertical direction, the outer member having a vertical height varying from minimum heights fore and aft aligned with the fore and aft axis through the outer member, to maximum heights aligned with the transverse axis; and
    control means disposed between the inner and outer members for controlling the conical rotational movement of the elongated body with respect to the frame such that rotational movement of the elongated body with respect to the frame about the fore and aft axis through the bushing is stiffer than conical rotational movement of the elongated body with respect to the frame about the transverse axis of the bushing.

5. The bushing of claim 4 wherein the said control means comprises an elastomeric annular member having substantially the same height around the circumference thereof as said outer member.

6. The bushing of claim 5 wherein the height of said outer member and said elastomeric member varies in a sinusoidal manner so as to include two opposing maximum height areas and two opposing minimum height areas disposed orthogonally with respect to one another.

7. The bushing of claim 4 wherein stiffness about said bushing fore and aft and transverse axes is controlled by varying the height of said outer member and said elastomeric member.

8. The bushing of claim 4 wherein said inner and outer members are tubular in shape and are concentric to one another.

9. The bushing of claim 4 further including a retaining member for attaching the elongated body to the outer member, the retaining member extending over the maximum heights of the outer member so a to form a stop for abutment against the vehicle frame.

10. The bushing of claim 4 wherein said control member is a solid circumferential elastomer.

11. An elastomeric vertical bushing for an axle suspension on a wheeled vehicle, comprising:
an outer tubular member;
an inner tubular member positioned within the outer tubular member; and
a tubular elastomeric body having a fore and aft axis and a transverse axis transverse to the fore and aft axis, the fore and aft and transverse axes extending along radii of the elastomeric body, the elastomeric body being joined to said inner and outer members, said elastomeric body having a height measured from a radial plane parallel to the fore and aft and transverse axes and vertically midway through the bushing, the height varying from minimum heights fore and aft relative to said fore and aft axis through the bushing, to maximum heights transversely of the bushing, wherein the minimum heights are at least greater than one-half of the maximum heights.

12. The bushing of claim 11 wherein elastomeric body height varies generally sinusoidally.

13. The bushing of claim 12 wherein the outer tubular member varies in height in the same sinusoidal pattern as the elastomeric body, such that the outer tubular member and the elastomeric body have the same vertical height throughout the circumference of the bushing.

14. The bushing of claim 11 wherein the outer tubular member and the elastomeric body have the same varying vertical height throughout the circumference of the bushing.

15. The bushing of claim 11 wherein the inner and outer member are more rigid than the elastomeric body.

16. The bushing of claim 11 wherein the elastomeric body has top and bottom ends, both ends varying in height from minimum heights fore and aft relative to the fore and aft axis through the bushing to maximum heights transverse to the fore and aft axis.

17. The bushing of claim 11 wherein the inner member has a height greater than the minimum heights of the elastomeric body.

18. The bushing of claim 11 wherein the elastomeric body is bonded to the inner member and pressed into the outer member.

* * * * *